United States Patent Office.

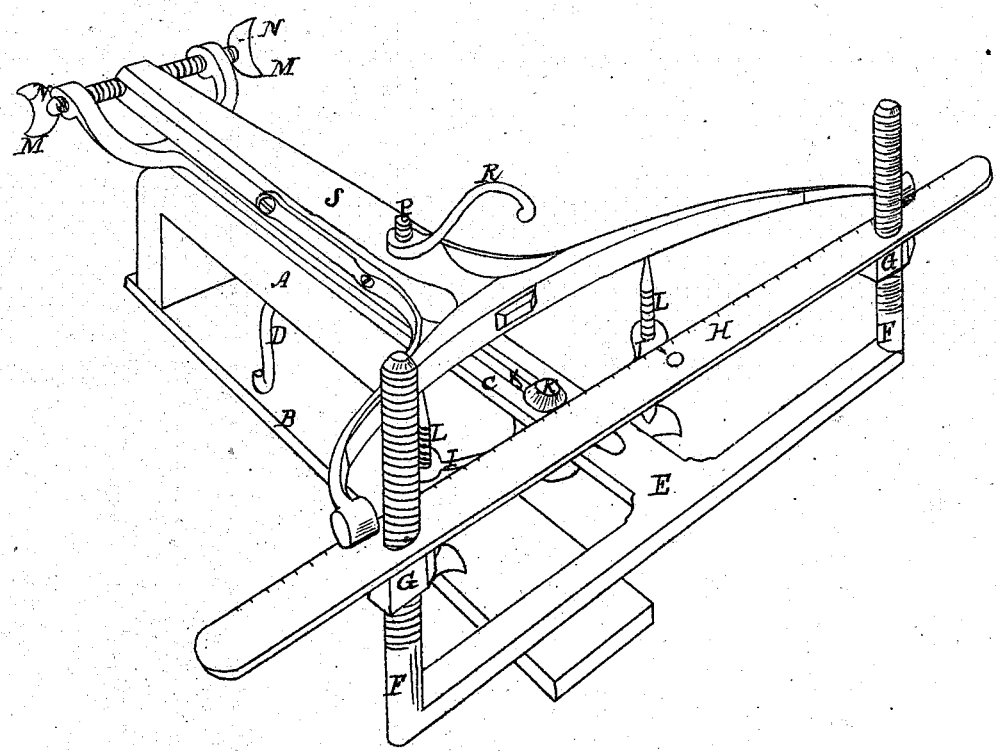

ALLEN J. BEACH, OF LINDEN, MICHIGAN.

Letters Patent No. 75,840, dated March 24, 1868.

APPARATUS FOR WORKING WAGON-TONGUES.

The Schedule referred to in these Letters Patent and making part of the same.

TO ALL WHOM IT MAY CONCERN:

Be it known that I, ALLEN J. BEACH, of Linden, in the county of Genesee, and State of Michigan, have invented a new and useful Improvement in an "Apparatus for Working Wagon-Tongues;" and I do declare that the following is a true and accurate description thereof, reference being had to the accompanying drawings, and to the letters of reference marked thereon, and being a part of this specification.

The object of my invention is to so construct an apparatus that it will be of use to the wagon-maker in working a wagon-tongue so that it will perfectly fit the wagon, work square with the axle, and prevent the necessity of altering and fitting the irons.

To accomplish this end, I construct my apparatus so that it can be attached to any wagon-maker's truss A. B represents the floor or a bench. On top of the truss A, I fasten the slotted bar C, by a countersunk bolt and hand-nut, D, or in any other suitable manner. To the end of the slotted bar C, I attach, by any suitable device, the standard transverse bar E, at the ends of which are fastened the upright rods F F, upon which proper threads are cut, to enable the nuts G G to be run up and down, as occasion may require. By means of these nuts G G working upon the upright rods F F, I am enabled to regulate and adjust the height and position of gauge-bar H. I is a proper lever, attached to and working in the slot J of the slotted bar C, by the screw and hand-nut K. Each end of this lever is provided with a set-screw, L L, for the purpose of adjusting the position of the roll of the tongue. At the opposite end of the slotted bar C from the transverse standard-bar E, I attach the ears M M, provided with set-screws N N, with which to hold and adjust the centre of the tongue in line with the point O in the gauge-bar H. P is a proper bolt, passing upwards through the slot J, and provided with hand-nut R to hold the tongue being worked firmly in place after it has been properly arranged, as hereinafter described.

To operate my "pole-gauge," secure the whole apparatus to the truss A by the bolt and hand-nut D, or any other suitable device. Then run up the gauge-bar H by means of the nuts G G on the upright rods F, to its proper position. Place the pole on the bolt P which passes through the slot J. Then draw a line from the point O to the centre of the pole, covering the centre of the pole its whole length, and hold the end of the pole in position by the set-screw N. Then fasten the pole to its place on the slotted bar C by turning the hand-nut R. Then slide the lever I to its proper position under the roll of the pole, and run up the set-screws L until the roll of the pole is square with the gauge-bar H. Then fit your irons, by which your pole is to be attached to the carriage, at equal distances from the centre of, and square with, the level of the gauge-bar H.

By these means a perfect fit will be obtained without trouble, saving much time in working and fitting a pole.

What I claim as my invention, and desire to secure by Letters Patent, is—

The construction of an apparatus for the purpose described, combining the slotted bar C, bolt and hand-nut D, the standard transverse bar E, the upright rods F, the nuts G, the gauge-bar H, the lever I, the hand-nut K, the set-screws L, the ears M, the set-screws N, the bolt P, and hand-nut R, with the bench or truss A, or their equivalents, when arranged and operating substantially as and for the purposes described.

ALLEN J. BEACH.

Witnesses:
H. G. HANNAMAN,
H. F. EBERTS.